United States Patent [19]

Tafoya

[11] Patent Number: 5,481,097
[45] Date of Patent: Jan. 2, 1996

[54] APPARATUS AND METHOD FOR DECODING BAR CODES

[75] Inventor: Benny R. Tafoya, Doylestown, Pa.

[73] Assignee: PSC Inc., Webster, N.Y.

[21] Appl. No.: 8,701

[22] Filed: Jan. 25, 1993

[51] Int. Cl.[6] ................................................ G06K 7/10
[52] U.S. Cl. .......................................... 235/462; 235/470
[58] Field of Search ........................... 235/462, 463, 235/467, 470, 379

[56] References Cited

U.S. PATENT DOCUMENTS

| | | | |
|---|---|---|---|
| 3,978,317 | 8/1976 | Yamaguchi et al. | 235/467 |
| 4,057,784 | 11/1977 | Tafoya | 235/462 |
| 4,289,957 | 9/1981 | Neyroud et al. | 235/462 |
| 4,308,455 | 12/1981 | Bullis et al. | 235/463 |
| 4,409,469 | 10/1983 | Yasuda et al. | 235/462 X |
| 4,488,678 | 12/1984 | Hara et al. | 235/462 X |
| 4,717,818 | 1/1988 | Brookman et al. | 235/462 |
| 4,973,829 | 11/1990 | Ishida et al. | 235/463 X |
| 5,115,121 | 5/1992 | Bianco et al. | 235/466 X |
| 5,124,538 | 6/1992 | Lapinski et al. | 235/463 X |
| 5,155,343 | 10/1992 | Chandler et al. | 235/463 X |
| 5,194,722 | 3/1993 | Mergenthaler et al. | 235/463 |
| 5,237,163 | 8/1993 | Collins, Jr. et al. | 235/462 |
| 5,262,625 | 11/1993 | Tom et al. | 235/462 |

*Primary Examiner*—Donald Hajec
*Assistant Examiner*—Jeffrey R. Filipek
*Attorney, Agent, or Firm*—Rene A. Kuypers; Joseph F. Murphy

[57] ABSTRACT

Random partial scans of a bar code label are utilized to re-create the entire symbol. The symbol is reconstructed by a re-match operation which places partial scanned data into memory and allows the data to be examined so that it is properly loaded whether data is acquired from scanning either the left or right side of the label first. Re-match allows labels having very small aspect ratios at extreme scanning angles to be readily captured.

35 Claims, 10 Drawing Sheets

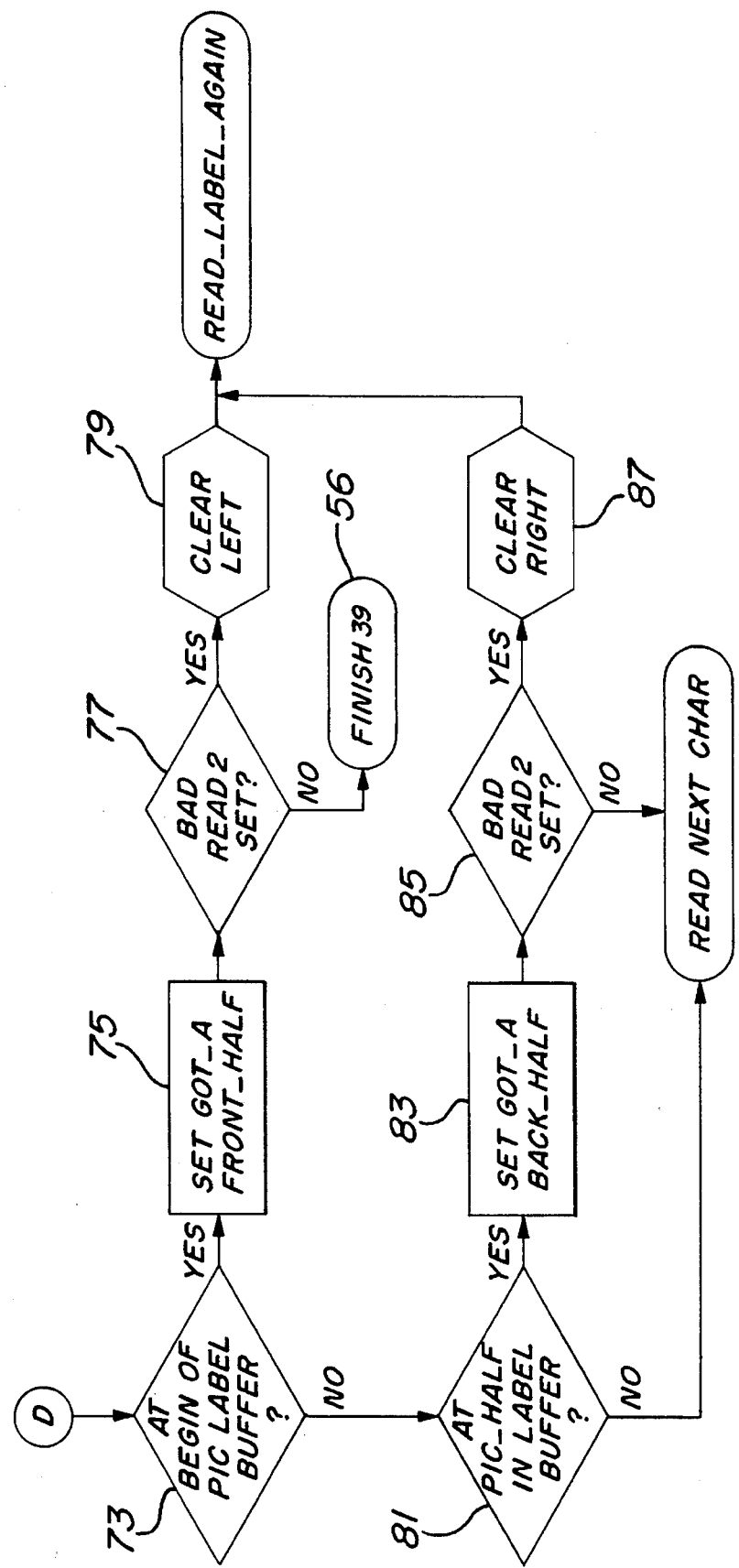

APPARATUS AND METHOD FOR DECODING BAR CODES

BACKGROUND OF THE INVENTION

The invention relates, in general, to an apparatus and method for acquiring data from bar codes. In particular, this invention relates to a system for re-creating the contents of a bar code label resulting from partial scans produced by different axis of a scanning beam.

Prior art in the form of patent U.S. Pat. No. 4,289,957 has attempted to read bar codes such as UPC codes through a technique using partial scans. However, the teaching of this patent is very limited in scope and in its overall capability. One such limiting factor is that the patent teaches that the scanning pattern must be divided into a top and bottom sweep thereby generating an upper half message and a lower half message; therefore, if the bar code requires that fourteen characters be read and interpreted, the top and bottom sweeps must respectively produce seven characters each to generate a completed fourteen character signal prior to decoding. If a sweep produces less than seven characters, no decoding can be produced; hence, an incomplete message is generated and the scan cycle must be repeated. This procedure is not conductive to a need for high speed bar code technology.

The above shortcoming may be further delineated. The prior art requires that the top and bottom sweeps are consecutive and always begin with a start or security code followed by seven utility characters. If such a security code is not found during a sweep, the information acquired cannot be utilized. In other words, the prior art patent teaches that the characters of a scanned code must be sequentially read from the first character to the last character of a set of seven characters including the security code or the data received cannot be interpreted; and, the last seven characters must also be read in sequence to complete the data capture. This is deemed to be too restrictive and time consuming for modern day decoding of a product code data field where more than one-half of the data is captured by a scanning beam.

The present invention is designed to produce a new bar code read and decoding method that is initiated by a sweep action of the laser beam as it impinges upon the bars and spaces of the coded symbol; furthermore, even though the beam sweep results in only a partial read of information, it is placed in a buffer memory until the remainder of the code is read in some following random scan. In this invention, the beam is omni-dimensional which produces a multi-axis scan. As a result, the present invention is designed to capture coded data with a random scanning action which enables the system to be more versatile. Furthermore, the present invention is designed to capture complete information on a coded label via partial scans of information even though the scans are initiated against the last character first.

It has been observed, in the present state of the art, that manufacturers in their efforts to add more information to existing codes such as the UPC (Universal Product Code), Code 39, Code 128, and Interleaved 2/5 (industrial codes) have done so with the concomitant effect that the code's aspect ratio (i.e., height of a bar/overall length of code) has decreased. As a result of the lowering of the aspect ratio, it has become more difficult for the art to achieve a high success rate in achieving initial reads of manufacturer's discount coupon and particularly when it has been clipped from a newspaper. This is particularly the case when coded coupons are placed upon a conveyor belt that is traveling at a speed of two hundred and fifty feet per minute at the manufacturer's redemption center. It is this procedure that is presently being utilized by the coupon issuers to ascertain the number of the coupons that have been redeemed by purchasers.

The scanning art, as represented by the above cited patent cannot achieve, it is believed, a reading of product codes with small aspect ratios on the order of 0.25:1 unless the label is in perfect alignment with two successive scan patterns. However, in actual practice the label is often skewed to the scan axis in its direction of travel and the bar code must be captured by a plurality of scans which may not necessarily be successive.

It is accordingly an object of this invention to provide a new and improved apparatus and method for reading bar codes that allows information to be captured using random sweeps of a scanning beam.

SUMMARY OF THE INVENTION

The invention pertains to an apparatus and method for combining incomplete data from random partial scans that impinge upon a bar code symbol that emanate from an omni-directional scanner. This combining of data obtained from random scans is referred to as re-match. The scanner of the invention develops multi-axis scans which produces not only the partial scans upon the coded label to enable re-match to occur, but it also has a high probability of achieving complete data capture on a single pass of one of the multi-axis scans.

The method of operation includes an arrangement for pre-processing acquired data (i.e., data from elements of a bar code) whether partial or complete to account for variations in the quality of printing of the bars that is found in newspapers and other media. The pre-processed data which is initially placed in a hardware buffer is eventually transferred to software buffers where it is evaluated and decoded into alpha-numeric characters for regular or re-match decoding.

The invention also includes an arrangement for making a determination on whether a particular bar code symbology is of a certain number of characters. Therefore, the apparatus herein is able to distinguish and conduct re-match whether a coded label is, for example of a ten or eleven character type such as found in the Code 39 symbology. It should be understood that the Code 39 label may be of other lengths as well.

Accordingly, it is an object of this invention to provide a new and improved apparatus and method for interpreting data obtained from the scan of a bar coded symbol.

BRIEF DESCRIPTION OF THE DRAWINGS

FIGS. 4a and 4b illustrates in block diagram form another aspect of the invention where flags are set to indicate that half of the label has been processed (ie, front or back half) and flags have been checked to see if errors are present so that characters can be cleared from a PIC buffer.

DESCRIPTION OF THE PREFERRED EMBODIMENT

Figure 1A:
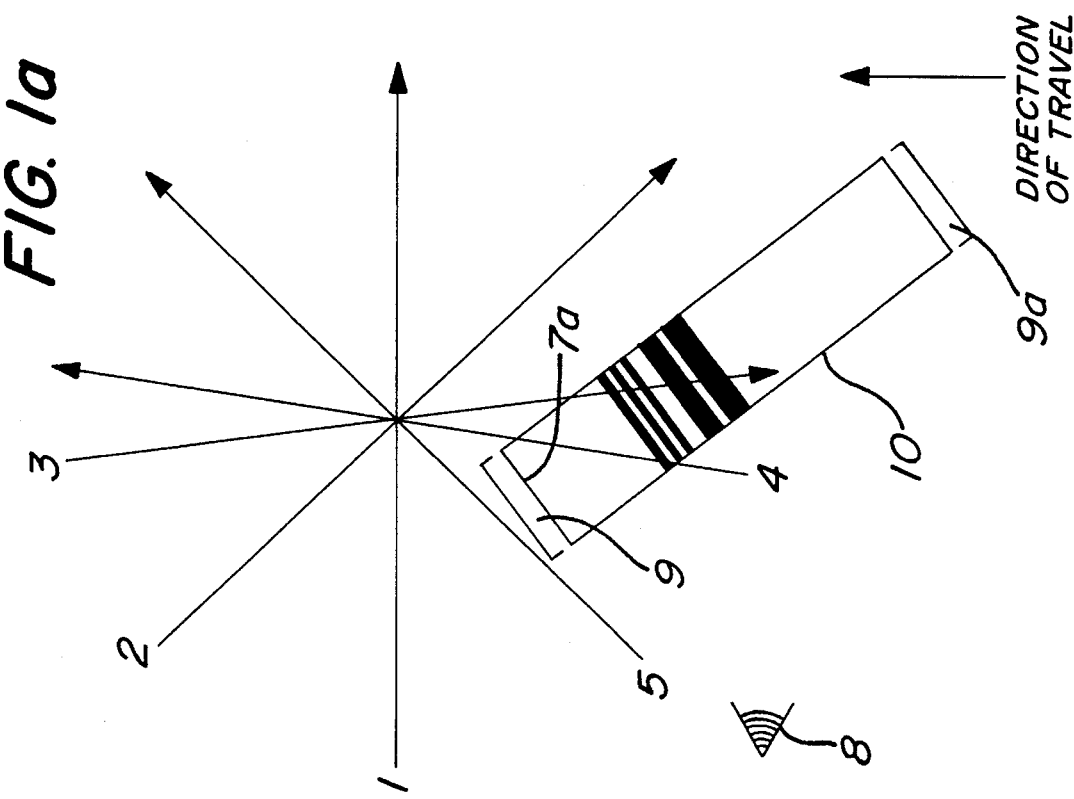
FIG. 1a is a pictorial of the multi-axis scanning pattern in relation to a bar coded label.
Figure 1:
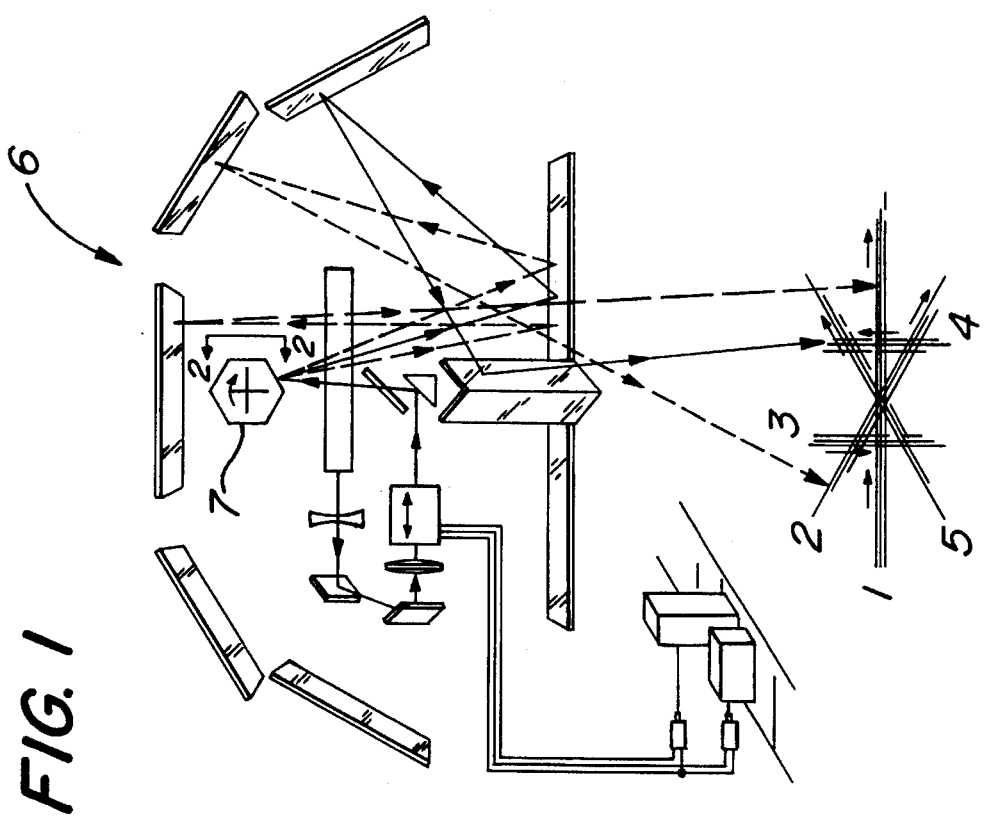
FIG. 1 is a view of the omni-directional scanner of this invention and illustrates the multi-axis laser scanning beam which is developed.

Referring now to FIG. 1 of the drawings, there is depicted an omni-directional scan pattern represented by lines 1 to 5 which is produced by a single scanner device 6. The scan pattern is initiated by a photo-electric eye 8 (FIG. 1a) and the leading edge 7a of a coupon 10 as it enters the scan area. The pattern shown is developed by a single laser beam which is reflected off of a rotating polygon mirror 7. The pattern depicts a pictorial representation of a five-axis scanning laser beam as it produces a defined crossing pattern in FIG. 1a which impinges upon the label 10 with scans in opposite directions through the label; and, for descriptive purposes only, the label is assumed to carry a Code 39 symbology consisting of a unique set of bars and space characters. The Code 39 is represented by a structure which includes three wide elements out a total of nine elements where an element is an area occupied by a bar or space; the nine elements consist of five bars and four spaces. The nine elements comprise nine bytes of data (as shown in FIG. 1a) which form a typical Code 39 character and as an example illustrates the character G. The scan lines 1–5 are produced in a random sequence and follow the number assigned to each as follows: line 1 travels horizontally from left to right; line 2 moves diagonally from top to bottom at a 45 degree angle; line 3 is slightly off vertical and travels from top to bottom; line 4 moves from bottom to top at an off set angle to the vertical; and; line 5 moves from bottom to top at a 45 degree angle. Lines 3 and 4 also move with respect to each other and are in an intersecting pattern at only one point as shown in FIG. 1a. Otherwise the lines 3 and 4 are non-intersecting as shown in FIG. 1.

The label 10 which may exist on industrial packaging is depicted as traveling from bottom to the top as viewed from the bottom of the drawings, and has already entered the scanning area as the information it carries is about to be read and later decoded. It should be noted that the scanner 6 is turned on when a photo-electric eye 8 is blocked by a leading edge 7a of label 10; in addition, it is noted that the label 10 may be skewed with respect to its upward direction of travel. Therefore, it may be difficult for any of the scan lines 1, 2, 3, 4, 5 to be in perfect alignment to capture all of the data represented on the label on a single pass.

Figure 2:
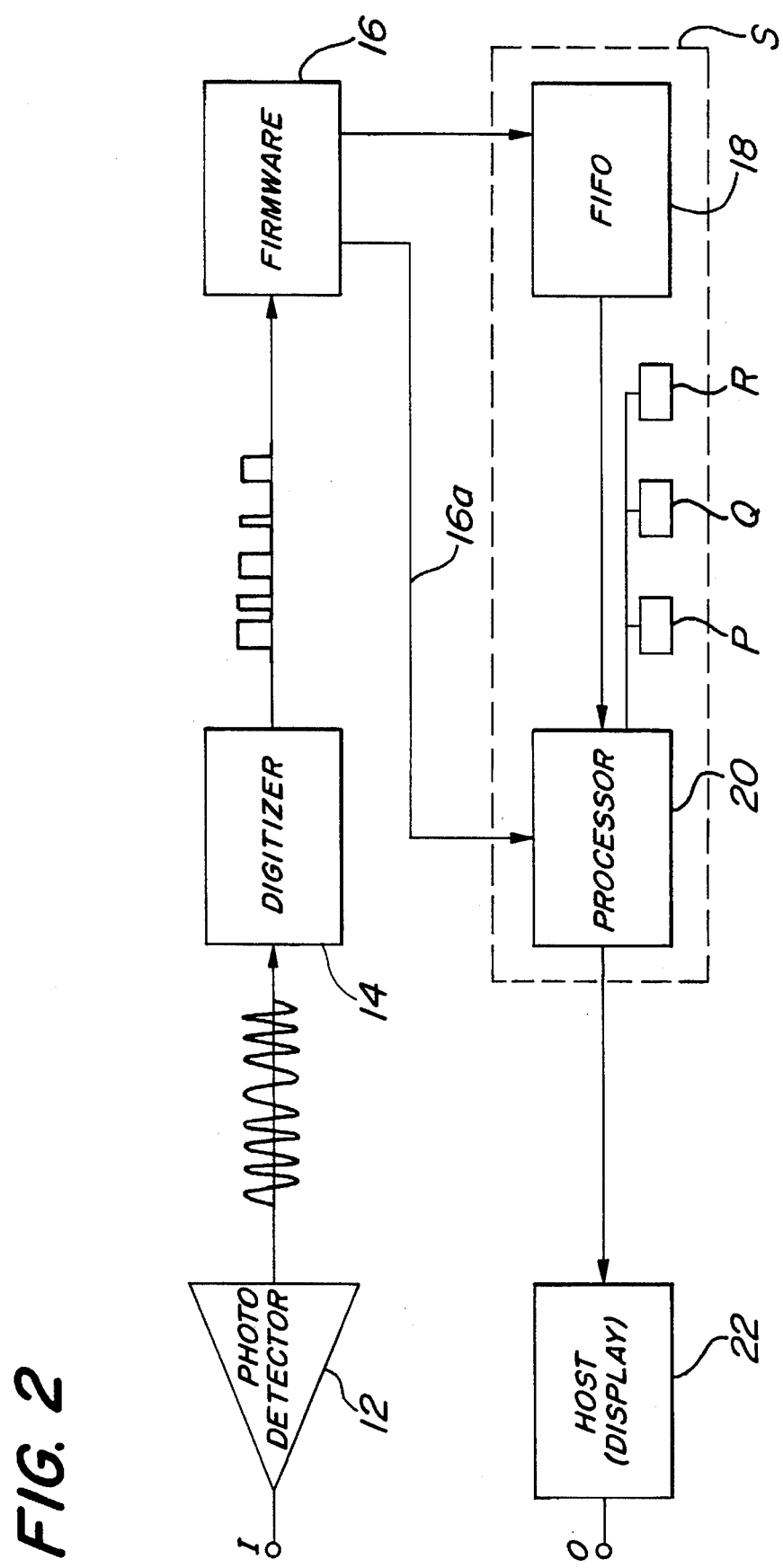
FIG. 2 represents, in block diagram form, the apparatus utilized in this invention.

After the scan lines 1–5 emanating from the laser beam apparatus 6 impinges upon the code carrying label 10, a signal corresponding to the location and size of the bars and spaces is produced which is captured as an input signal I to photo-detector 12 if FIG. 2. The photo-detector 12 produces an analog signal whose form is essentially shaped by whether a bar or interval is scanned. This analog signal is fed into a digitizer 14 where the signal is transformed into digital pulses whose width is directly related to the width variations of the analog. The variable width output pulses from the digitizer 14 are fed into firmware 16 which is comprised of a plurality of gates, registers, comparators, and flip flops and are formed into a programmed chip. The firmware 16 is employed to pre-process the data by measuring the width of the pulses received from the digitizer 14 in hexadecimal (hex) form. This pre-processing is utilized to overcome variations in printing that may be produced by the trade.

The firmware 16 also measures quiet zones (QZ) 9, 9a (FIG. 1a) in hex form which are areas that are clear and free of all printing preceding a START character and following a STOP character; furthermore, the QZ determines whether actual useful data is to be found in juxtaposition thereto. This is a particularly important aspect of the firmware 16 since by way of example the present day discount coupon, which carries the UPC code, surrounds the bar coding with ordinary reading information; therefore, the detection of the QZ allows only worthwhile data to be decoded and enables spurious signals to be rejected that might emanate from the scanning of readable printed matter. In the invention, the QZ is designed to be four or eight times the width of the narrowest element (i.e., bar or space) depending on a switch setting located in hardware or firmware.

The pre-processed data that is obtained from the firmware is directed into a hardware FIFO 18 which is comprised of a plurality of registers nine bits wide and stacked two thousand bytes deep. Each register is two hex characters (eight bits) wide and is adapted to receive eight bits at a time. Once a QZ 9, 9a is found to be four or eight times the width of the narrowest element by the firmware 16, it is stored in the first register of the FIFO 18; therefore, it can begin to receive the hex values from the firmware 16 representative of the elements of the captured code. The data stored in FIFO 18 is serially transferred upon generation of an external interrupt signal to the processor 20 one byte at a time where it is stored in a random access memory location of a software FIFO. Line 16a is used to provide a signal to toggle the processor 20 to initiate decoding of the captured data. The decoded information is sent to host 22 which may represent a display of alpha-numeric characters related to the coded label 10. The technique for processing random partial scans such, for example, as scans 1, 2, and 5 or 3 and 2, or 1, 3, or 5 alone in FIG. 1 will be referred to hereinbelow as re-match of a bar code and is utilized to re-create the entire symbol. Re-match in the worst case condition needs no more than two scans as to capture data from a valid bar code. However, more scans may be required to decode a label 10 if per chance the printing were defective. While the scanning patterns 1 to 5 may routinely capture data from the passing codes without activating re-match, the technique becomes significant with labels carrying very small aspect ratios which are scanned at extremely skewed angles.

In an actual embodiment, the processor 20 and the hardware FIFO 18 are placed upon a decoder circuit board S in combination with re-settable switches P, Q, and R. These switches are connected to firmware located in the processor 20 and become operational when the scanner 6 (FIG. 1) is initially powered. The firmware together with switches P, Q, and R cause the system to go through a routine for determining, for example: what and how many reads are required before there is a transmit; what code is being used; what length of code is employed.

Figure 3A:
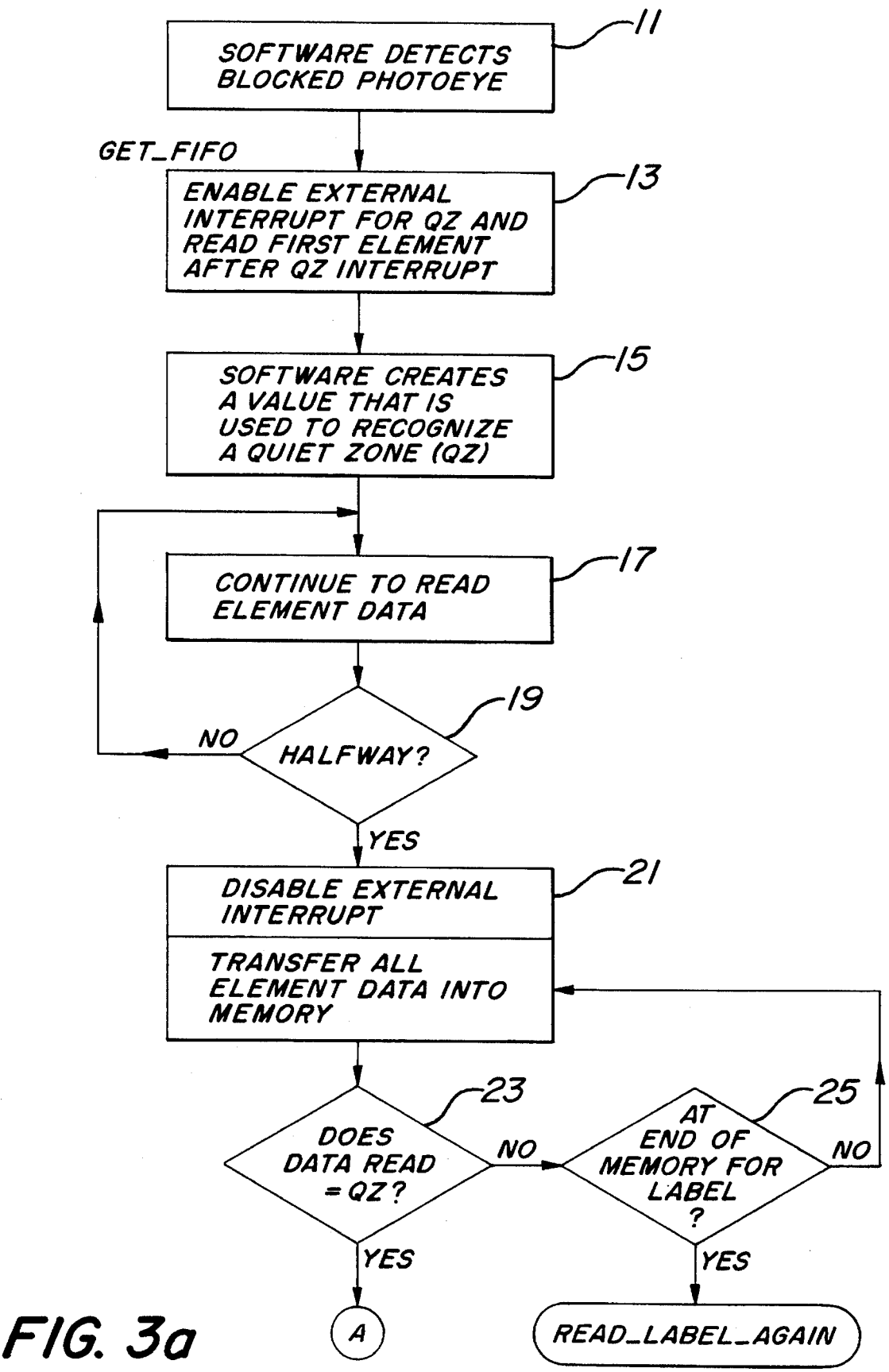
FIG. 3a is a portion of the invention in block diagram form where the diagram is concerned with reading into a software FIFO memory from a hardware FIFO memory; and, FIG. 3b is related to whether a STOP/START character is found with the element data; whereas FIG. 3c relates to decoding and translating of element data plus verification.
Figure 3B:
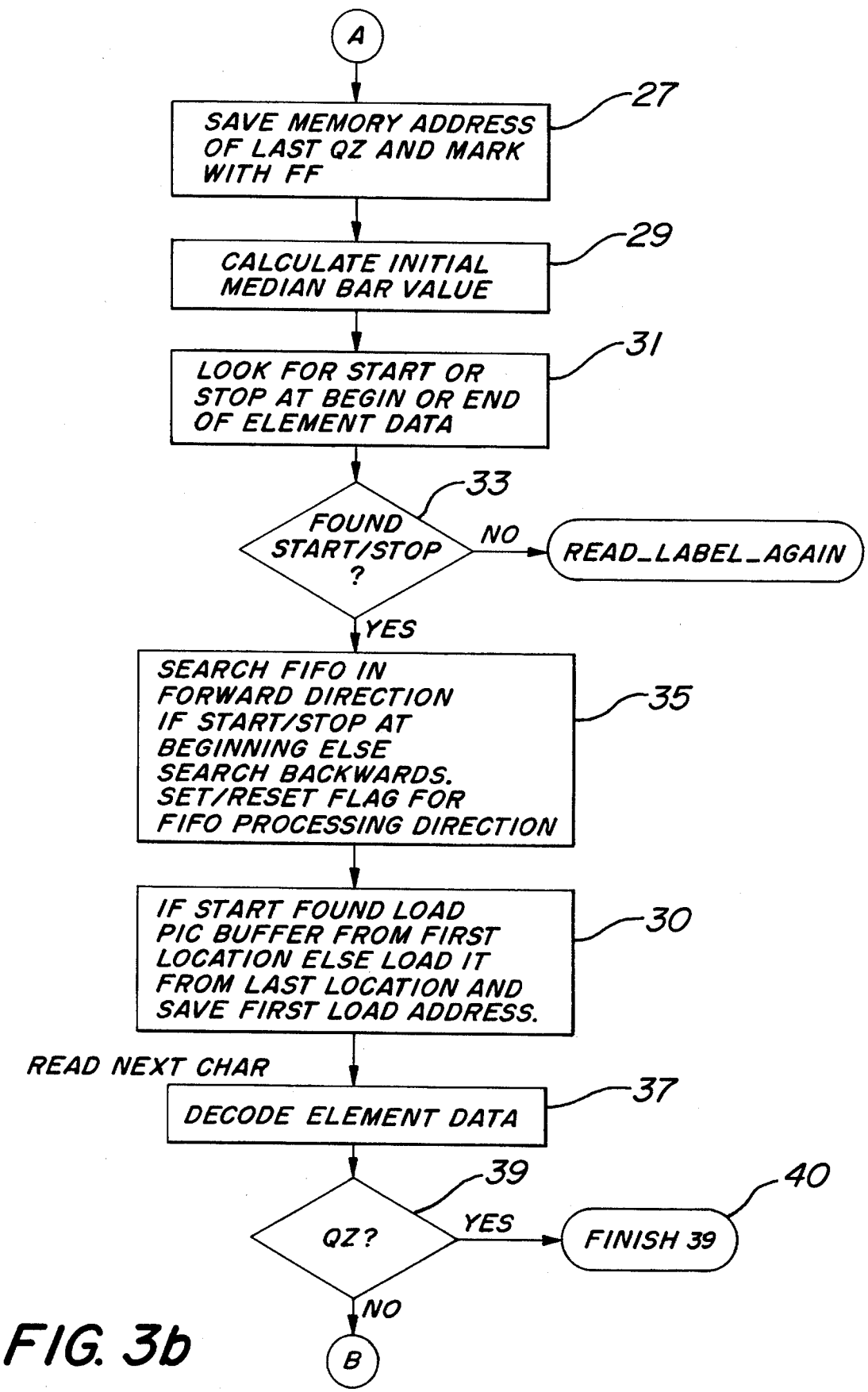
Figure 3C:
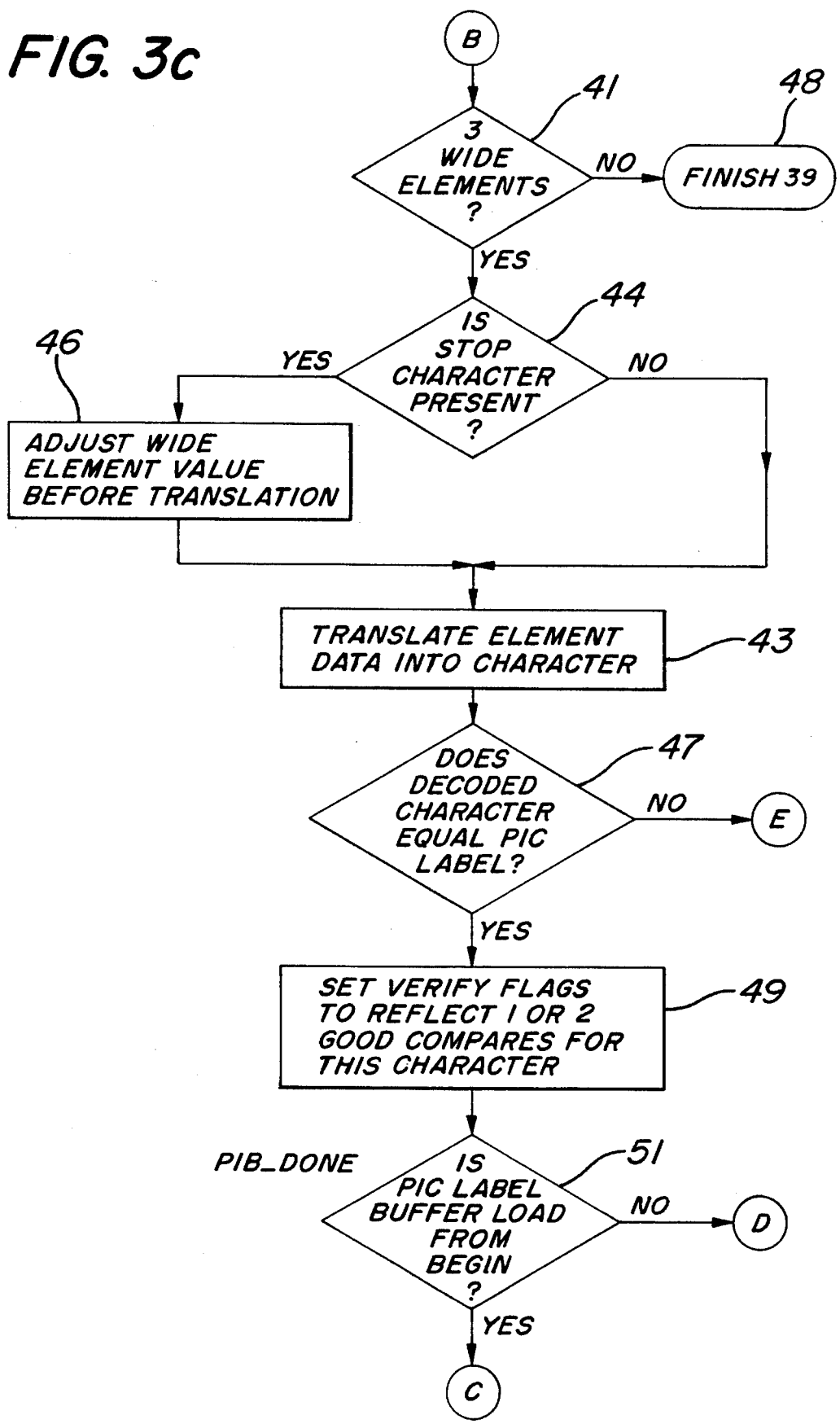

Reference is now made to FIGS. 3a, 3b, and 3c of the drawings and to the general flow chart which is depicted. Let us assume initially that a decoding is to take place when any two random scan line 1 to 5 (FIG. 1a) are respectively able to capture portions of the entire code placed upon label 10. As the leading edge 9a of label 10 travels upwardly to be read and decoded, it enables the photo-electric eye 8 to be blocked and is detected by the software as stated in block 11. This signal informs the processor 20 that data has been read and is available, and signals it to cease doing any other processing. After the above has been accomplished, the external interrupt for a QZ is enabled in block 13 and the first element of the code is read after the QZ interrupt from the hardware FIFO 18 into the RAM of the software FIFO located in processor 20. However, for a read of a first coded element to be valid in the present embodiment, the QZ as determined by the firmware 16 must have a value of at least four times the value of the first element. Therefore, the first byte in the FIFO register representing QZ must be four times larger than the first element scanned of the code and, if this criteria is not met, the data is dumped. If the data is dumped, it signifies that the scans 1–5 may have impinged upon extraneous printing matter that does not pertain to the code itself. If the QZ meets the criteria of block 15, the operation continues to read element data as shown by block 17.

Figure 6A:
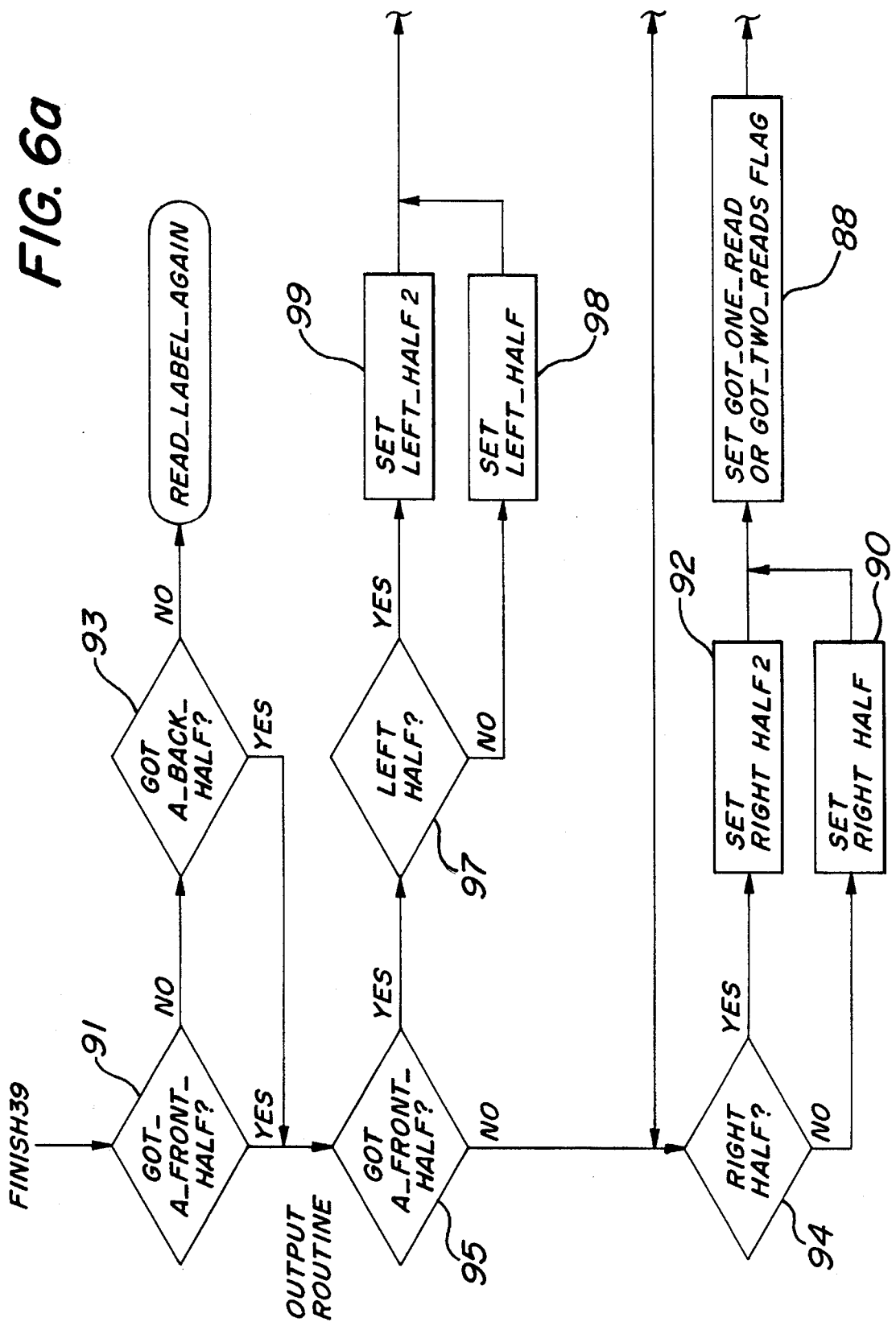
FIGS. 6a and 6b depicts in block diagram form a portion of the invention and relates to whether the label or code has been read successfully a number of times and if so, the decoded data is sent to a host for display or other device such as a conveyor for diverting products at a particular location.
Figure 6B:
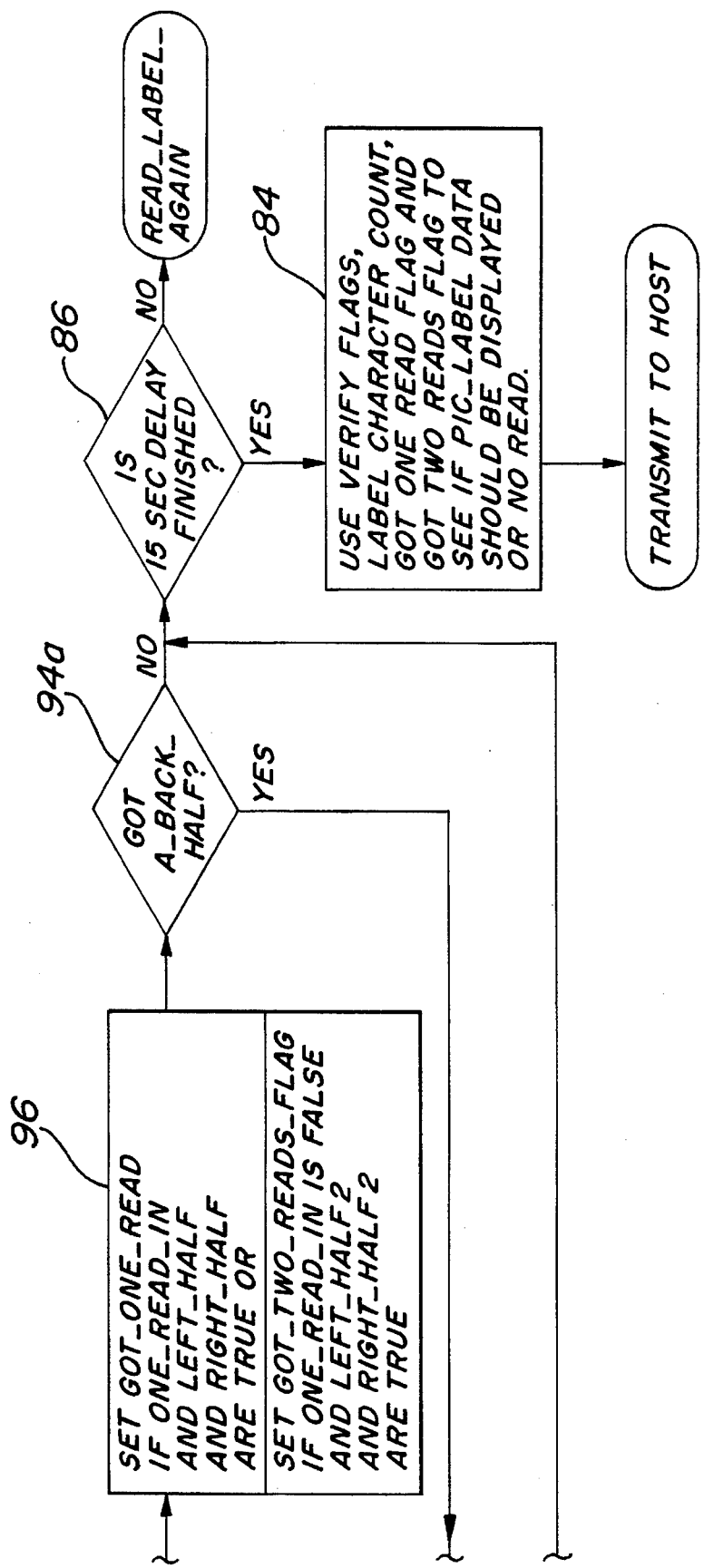

Element data will continue to be read into the RAM until one-half of the data is acquired as indicated by decision point 19. Until one-half of the element data is received in memory, the system will continue to read as indicated by NO on point 19. The test for one-half of element data is used to both assure sufficient data is present to process and to cease acknowledging additional QZ interrupts to allow a single set of element data to be received. When half of the data is reached as indicated by YES on point 19, a disable external interrupt signal is generated which operates to discontinue further QZ interrupts, and continues to transfer the hardware FIFO data in excess of the half-way point of the element data into the software FIFO buffer until the ending QZ is detected for this set of element data as indicated by blocks 21 and 23. Block 23 further inquires whether the character just read equals the QZ. This block therefore asks whether an ending QZ is found with the element data. If the indication is YES, the operation transfers to Ⓐ in FIG. 3c where a search for START/STOP codes together with the data begins. If NO, statement 25 asks whether the software FIFO in processor 20 has memory space available. If there is no memory space available, the label is read again; otherwise, data continues to be transferred into memory. The memory address of the last QZ is saved and identified with FF (hex) as stated in block 27. The memory address is saved in block 27 to facilitate locating the STOP or START code of the end at the element data in the software FIFO as indicated by block 31. The mean of the wide bar and space values are calculated in block 29. The median value is used during the decoding of element data to identify wide and narrow bars and spaces. Once the median bar value has been calculated, the system looks for the START or STOP code at the respective beginning or end of the element data as set forth in block 31. A START/STOP is a unique character used to identify the leading and trailing end of a bar code symbol or label. The START/STOP character respectively precedes the most significant character and follows the least significant character of a label. A START/STOP must be detected initially to establish processing direction for the software PIC and FIFO buffers located in processor 20 (FIG. 2). A search is made in the software FIFO buffer to determine if a START or STOP code is at the beginning or end of FIFO data. Then a flag is set or reset to indicate the FIFO processing direction as in statement 35. If the START code is found in the FIFO buffer, the PIC buffer is loaded from the first location; if not, the buffer is loaded from the last location and the first load address is saved according to block 30. The element data is therefore processed from either end of the software FIFO buffer and is decoded in block 37 and placed into the proper end of the software PIC buffer. Decoding of the element data is accomplished by taking nine data bytes associated with the various elements of the 39 barcode and changing them into two bytes. The least significant five bits of one byte represent the bar values of the code; and, the least significant four bits of the other byte represent the space values of the code. A bit value of one signifies a wide bar or space. The system then inquires whether a QZ has been found after decoding half or more of the data as stated in decision block 39; if the answer is YES, the flow chart reverts to FIGS. 6a and 6b of the drawings. Block 39 essentially inquires whether all element data has been processed, and if not to continue the decoding process in the flow chart at Ⓑ in FIG. 3c, and if YES to transfer to FIGS. 6a and 6b to ascertain whether the entire label has been acquired successfully the required number of times.

The Finish Code 39 status as indicated by location 40 is also utilized in locations 42, 48, and 50, and the system in block 91 inquires whether the PIC buffer has the front half of the symbol information. If the answer is NO, a check is made whether there is a back half at point 93. If the answer is NO, the label is read again. If the answer is YES, there is a transfer to the output routine where it is questioned whether there is a front half of data in the buffer according to block 95. If the answer is YES, block 97 asks whether the left or front half has been read successfully more than once. If the answer is YES, the left-half-2 flag is set as in block 99. In this invention, there is a capability for two reads for redundancy purposes by a single setting of a switch located on a decoder board in firmware 16 (FIG. 2). If this is the first time the left half has been read successfully, then the left half flag is set in block 98. A flag is a place in memory (one bit) that indicates a YES or NO. In the event that either flag in block 98 or 99 is set, a decision is made by the software in block 96 as follows: if one read mode is indicated by a switch and the left and right half have been obtained once, then the got-one-read flag is set; if a two read mode is indicated and the left half and right half have been obtained twice then the got-two-read flag is set in software.

The logic in block 94a continues to inquire whether a back half of data has been obtained and follows the discussion above with respect to obtaining the front half. Block 94 inquires how many times the right half of the label has been read successfully. If it has been read once successfully, the flag in block 90 is set; otherwise, the flag in block 92 is set and indicates two successful reads of the right half. In block 88, got-one-read flag or got-two-read flag is set by using the same criteria as for block 96 above mentioned.

Decision block 86 is used only if a timer is used in place of a photo-eye 8. A timer is used to acquire symbol data within a specified time period. The system provides a choice in the data declaration of the software in using photo-eye or the time delay. For purposes of description, only the delay option is utilized. If a fifteen second delay has expired in accordance with statement 86, the verify flags of block 49 (FIG. 3c), the label character counter of block 45 and the got-one or got-two read flags in blocks 88 and 96 are used to see if the PIC label data should be displayed or a no read message is sent out. If a successful read has occurred, the decoded label is shown on the display at host 22 of FIG. 2.

If there is no read, the display indicates this by a display of question marks or the like. This would therefore be the end of the cycle.

Figure 5:
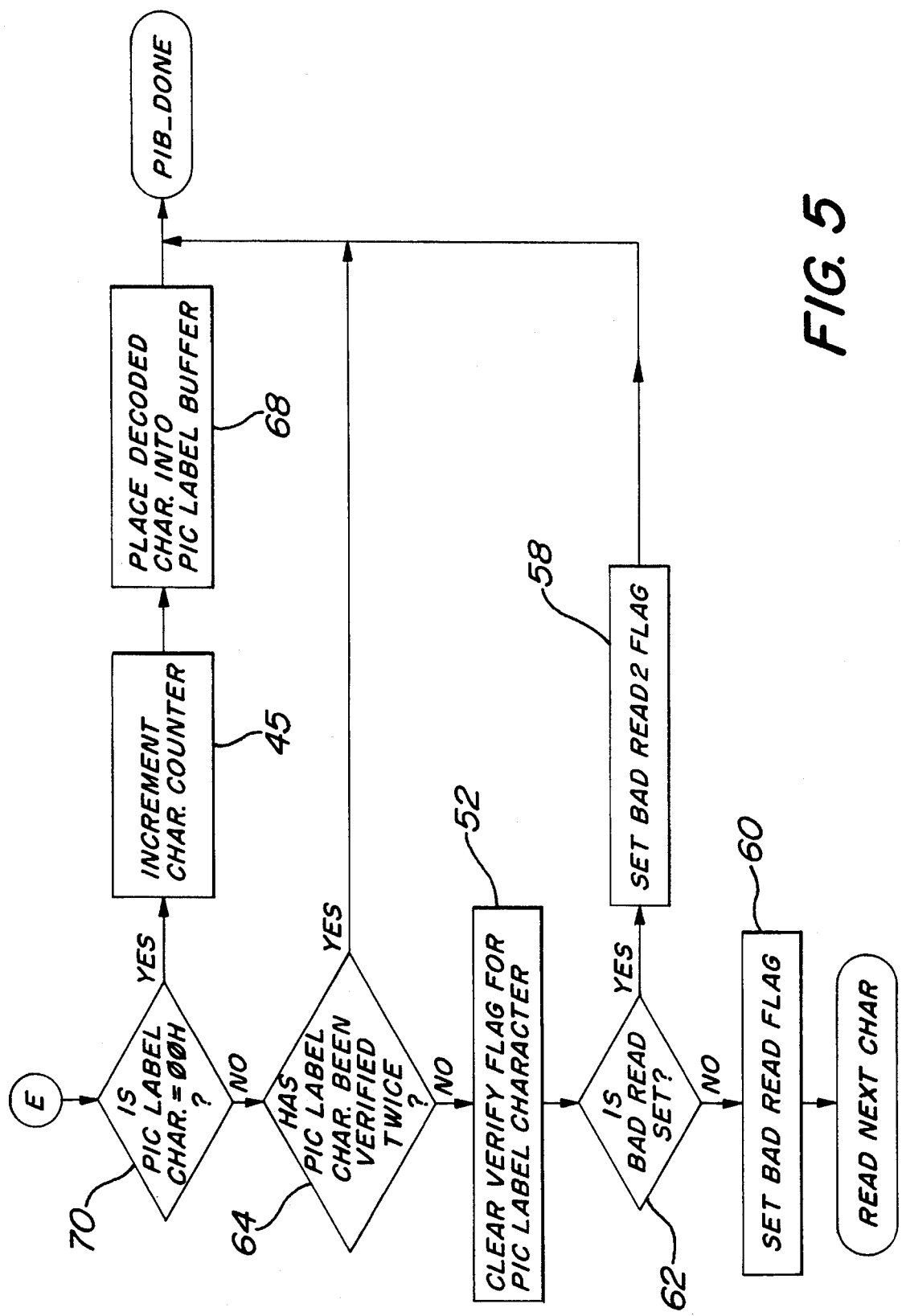
FIG. 5 illustrates in block diagram form another portion of the invention where a determination is made whether a decoded character should be placed in the PIC buffer and, if not, is it equal to or the same as the character already in the buffer.

Returning again to the flow chart of FIG. 3 if a QZ is not found in statement 39 or all of the element data has not been processed, the decoding of the data elements are examined via Ⓑ according to decision block 41 to determine whether three out of the nine elements are wide in accordance with the prerequisites of a Code 39 character. If no such wide elements are found, the character is not considered legitimate and it is not processed and the software continues to the Finish 39 block of FIGS. 6a and 6b. If three out of the nine elements of a Code 39 character are found to be wide, decision block 44 asks if there is a STOP character present. If NO, the elements are translated into characters by the processor 20 in accordance with block 43. The translation of the element data signifies that the bit data produced in block 37 is changed into readable alphanumeric characters. If a STOP character is present with the element data as in block 44 then before there is a translation of data into a character in block 43, the decoded wide elements are adjusted to position them in the right order as in block 46. This is necessary because what was assumed to be the first element of a character was really the last since the elements are decoded relative to the STOP character at the end of the label. Decision block 47 is where the test is made to see if a decoded character is placed into the PIC software buffer. At this point, the combining of data from partial scans begins. If a decoded character is not equal or the same as the PIC label character then the software asks whether the PIC label character buffer location is available [equal to 00 (hex)] as in statement 70 following Ⓔ (FIG. 5). If the decision is YES, then each character that is placed into the PIC software buffer causes a character counter in the processor 20 to be incremented by one. In our example, there can be ten or eleven characters in a Code 39 label so that the counter is incremented until it reaches ten or eleven as the case may be. The counter is always re-set to zero after transmission to host 22. The decoded character is stored in the PIC label buffer as in statement 68 and the PIB (place in buffer) is done. After the PIC label buffer is loaded then the software reverts to statement 51 which asks whether the buffer is being loaded from the beginning or end. This depends on whether the STOP or START code was detected first with the element data as in block 30. If the START character is detected then the PIC buffer is loaded starting from the first position; but if the STOP character is detected, PIC buffer is loaded starting from the last position.

If the decoded character is the same as the character in the PIC buffer in statement 47, verify flags are set to reflect one or two good matches as in statement 49. Comparison checks are conducted in the present system to obviate a possibility of capturing incorrect data due to bad printing of the label 10. After the verify flags are set, a determination is reached as identified by decision point 51 whether the software PIC buffer in processor 20 is filled from the beginning. Statement 51 is asking which end of the PIC buffer is being loaded first to determine whether the front (left) half or the back (right) half has been acquired. If the PIC buffer is being loaded from the beginning then the flow chart reverts to path Ⓒ; otherwise, it reverts to path Ⓓ. In path Ⓒ, decision point 55 asks if this is the last character position in the PIC buffer. If the answer is YES, a flag is set in the processor 20 that the back half of the label has been acquired as stated in block 57. A check is next made at decision point 59 as to whether a bad-read-2 flag has been set. This flag is tested and set in the flow chart of FIG. 5. The bad-read-2 flag means that there has been two character mismatches for half of the label which is cleared of all unverified bytes (i.e., a character) as will be discussed further hereinbelow. If the answer is NO or that no flag has been set, processing continues at block 91 where the flow chart indicates Finish 39 (FIGS. 6, 6a, and 6b/7) to see if the label is complete. If there was a bad read as indicated by YES, data in the back (i.e., right) half of the buffer is cleared as illustrated by block 61 and the label is scanned again. At block 61, the system looks at the verify flags to determine if a label character will remain in the buffer or is cleared. As a character is cleared from the PIC buffer, the character counter 45 is decremented by one. This is needed to keep track of the number of characters that exist in the PIC buffer.

Returning to decision point 55, if this is not the last character position of the PIC label buffer as indicated by NO then decision point 63 asks if this is the half way character position in the buffer. If the answer is YES then a flag is set in block 65 that a front half of data has been obtained. Decision point 67 asks whether a bad-read-2 flag has been set. The bad-read-2 flag is set if there are two mismatches between any decoded character and the character already in the PIC buffer location that the decoded character would be placed into. If the answer is NO, the next character of the code is processed. If the answer is YES, then the left side of the buffer is cleared as indicated by decision point 71, and the label 10 (FIG. 1a) code is read again.

Figure 4A:
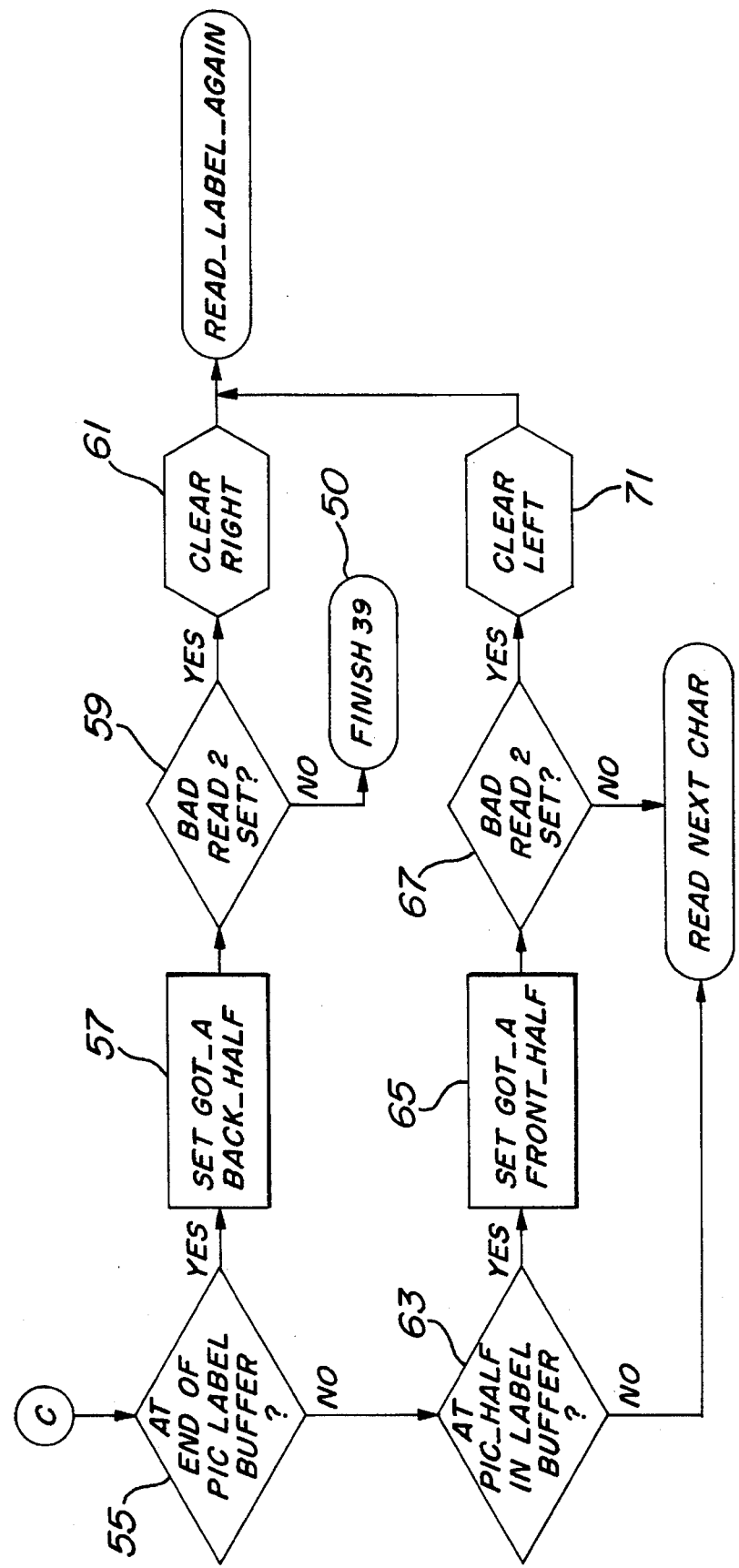

The logic path Ⓓ (FIG. 3c) at decision point 73 (FIG. 4b) asks if this is the first character position in the PIC buffer. If the answer is YES, a flag is set as indicated by block 75 that a front half of data is in memory. Decision point 77 requests whether or not the bad-read-2 flag has been set. If the answer is NO, processing continues at block 91 (FIG. 6a) to see if the label is complete. If two character mismatches have occurred, the left half of the buffer is cleared and the label is read again.

Decision point 81 asks if this is the half way character position in the PIC buffer. If the answer is YES, the flag is set that a back half of data has been obtained as indicated by block 83. Decision point 85 then asks if two character mismatches have occurred. If the answer is YES, the back half of the data as indicated by block 87 is cleared and the data is read again. However if the answer is NO to point 85, there has not been two character mismatches, the next character is read.

Returning again to FIG. 3c, statement 47 makes a comparison between the character just translated from the element data and the character in the PIC buffer where the translated character should go. If the answer is NO, the characters are not the same the software reverts to Ⓔ of the flow chart (FIG. 5). Decision 70 inquires whether the PIC buffer position is available in memory as denoted by 00 (hex). If the answer is NO, decision point 64 asks whether the character in the PIC buffer has been verified twice. If the answer is NO from decision point 64 then decision point 62 asks whether a bad-read flag was set. If the answer is NO, the bad-read flag is set in block 60 and the next set of element data is processed. However, if the answer is YES, then the bad-read-2 flag is set in block 58. After it has been set then decision point 51 asks whether the PIC label buffer is loaded from the beginning. If the answer is NO, the software reverts to Ⓓ in FIG. 4b; however, if the answer is YES, the software reverts to Ⓒ in FIG. 4a. If the answer is YES from decision point 64, processing continues at decision point 51 in FIG. 3c.

In summary, the present invention which has been described with a Code 39 symbology employs an omni-directional scanner that produces a plurality of scans in different directions and wherein a coded label is scanned by any one of the scans in a random manner. In the event that the label is skewed in its direction of travel through the scanning area certain of the scanning beams will only capture a portion of the total data. The invention allows the total label to be recognized or re-matched from the partial data obtained from one or more scans.

Upon the partial capture of data via the scanning process, it is pre-processed by firmware and the QZ is evaluated to determine its duration. This evaluation is obtained in order to allow valid or worthwhile data to be captured rather than spurious data from unwanted sources. The data is also pre-processed in firmware by measuring the width of the data pulses in order to overcome variation in printing. The pre-processed data is then transferred to a hardware FIFO memory in the form of hexadecimal values. The hex values of the data are then transferred to the software FIFO memory provided that the QZ meets the criteria that has been established and in this invention is established to be at least four times the value of the first scanned element.

The mean value of the wide bar and space values is also calculated to properly identify the Code 39 label. After the mean value is established, the operation then looks for the START/STOP code at the beginning or end of the element data in order to establish the processing direction for the buffers. There is a search made in the software FIFO buffer to determine if a START or STOP code is at the beginning or end of the FIFO data. Hence, if a START code is found in the software FIFO buffer, the PIC buffer is loaded from the first location; and if not, the PIC buffer is loaded from the last location.

After locating the START or STOP code and its position in memory, decoding of the element data takes place until a QZ has been found. When one half or more of the data has been processed then the system reverts to a mode which determines whether both halves of the label have been captured and whether the data has been read successfully the required number of times. If a QZ is not found or all of the elements have not been processed, a determination is made as to whether three out of the nine elements are wide in accordance with Code 39 symbology. If they are and a STOP character is present with the data then before there is a translation into a character, the elements are adjusted to position them in the right order. This is required since what was assumed to be the first element was really the last since they are decoded relative to the STOP character at the end of the label.

Upon translating the element data into characters, a test is made to determine whether they are placed into the PIC label buffer. At this point, the combining of data from partial scans begins and if the decoded character is not the same as the PIC label character then the software asks whether the PIC label character buffer location is available. If available, the decoded character is stored in the buffer. The direction of loading of the PIC buffer will be determined whether the STOP or START code was detected first. If the START code is detected then the PIC buffer is loaded starting from the first position; but if the STOP character is detected, the PIC buffer is loaded from the last position. This type of processing will enable a determination to be made whether the left half or the right half of the label has been acquired such that the entire label may be properly read.

This invention which may be employed with other symbologies has been described by reference to precise embodiments, but it will be appreciated by those skilled in the art that this invention is subject to various modifications and to the extent that those modifications would be obvious to one of ordinary skill they are considered as being within the scope of the appended claims.

What is claimed is:

1. An apparatus for interpreting a bar coded symbol formed of bars and spaces comprising,
   a.) means for generating a plurality of random scans which respectively impinge upon and produce reflected signals related to partial information carried by said symbol, and said symbol being comprised of elements of data;
   b.) means for loading said partial information into a first memory from any one of said random scans, and said partial information being accompanied by beginning and ending quiet zones;
   c.) means for searching for a START or, alternatively, a STOP code in combination with said partial information in said memory for determining a direction for processing said data;
   d.) means for decoding said partial information when data is valid and converting it into characters for placement into an end of a second memory in accordance with whether the START or STOP code was located;
   e.) means to load additional partial information in said first memory wherein said additional partial information is obtained from any other one of said plurality of random scans, said additional partial information comprising new data which is accompanied by different beginning and ending quiet zones;
   f.) means for searching for a START or, alternatively, a STOP code that was not previously obtained,
   g.) means for decoding said additional partial information by converting said data into characters for placement into a different end of said second memory to complete an acquisition of said symbol;
   h.) means for receiving said decoded data and translating it into readable form,
   i.) whereby a symbol of small aspect ratio may be determined.

2. The apparatus in accordance with claim 1 wherein said first memory comprises a FIFO means.

3. The apparatus in accordance with claim 2 and further comprising,
   means for measuring a first data element of partial information acquired by any random scan to determine if its width dimension is less than four, or alternatively, eight times a width dimension of said beginning quiet zone before said information may be considered valid for storing in said FIFO means.

4. The apparatus in accordance with claim 3 and further comprising,
   means for creating a new quiet zone value after the width dimension of the first data element has been determined.

5. The apparatus in accordance with claim 4 and further comprising,
   means for evaluating the width of each bar and space against the value of said new quiet zone prior to storing in said FIFO means.

6. The apparatus in accordance with claim 2 and further comprising, means for testing said elements of data in said FIFO means to determine their median value.

7. The apparatus in accordance with claim 2 and further comprising, means to determine if sufficient data is stored in the FIFO means by said any one scan to comprise at least one-half of the information comprising said symbol, such that when one-half said data is present, it is transferred and stored in a second memory; said data being discarded from said FIFO means if less than one-half is acquired.

8. The apparatus in accordance with claim 7 for transferring one-half said data into a memory means for directly decoding said data elements, and a remaining one-half of data acquired by any other one of said random scans being transferred into said memory means for direct decoding, whereby the decoding of the two-halves of data allow the symbol to be displayed in alpha-numeric form.

9. An apparatus in accordance with claim 1 wherein said random scans are produced by a beam of coherent light that is reflected off of a rotating mirrored surface, a plurality of other fixed mirrored surfaces, and two moving mirrored surfaces to produce a multi-axis pattern consisting of a horizontal, two diagonal, and two substantially vertical shifting lines which intersect only once in their movement.

10. An apparatus in accordance with claim 1 and further including timing means for allowing scanning by said any random scan to occur within a certain time frame.

11. An apparatus in accordance with claim 1 and further including, means for counting the number of characters that have been decoded to determine whether acquired data is complete for displaying into alpha-numeric form.

12. The apparatus in accordance with claim 1 wherein a pattern established by any said random scans enables at least one-half of the bar coded symbol with an aspect ratio as great as 0.25:1 to be captured.

13. An apparatus in accordance with claim 1 and further including means for pre-processing said reflected signals with respect to their dimensional characteristics.

14. An apparatus in accordance with claim 13 wherein said means for pre-processing data further comprises acquiring numeral value of the width duration of quiet zones with respect to said symbol, and further comprises obtaining the bar width of said code as hexadecimal numbers.

15. An apparatus in accordance with claim 14 wherein said pre-processed bar widths are evaluated to determine their median value.

16. An apparatus in accordance with claim 1 and further including means for evaluating dimensional characteristics of certain ones of the code being scanned by said random beams to determine its validity.

17. An apparatus for interpreting a bar coded symbol comprising, a.) means for producing a plurality of random and omnidirectional scans of a beam any one of which respectively impinges upon and produces reflected signals related to partial information carried by a label bearing said bar coded symbol, and said symbol being comprised of elements of data and at least a first quiet zone;

b.) means for receiving said reflected signals initiated by said any one scan and storing the elements of data and quiet zone into firmware means;

c.) means for pre-processing by said firmware means a first bar comprising said data with respect to said first quiet zone by ascertaining that said first quiet zone is at least four times wider than said first bar;

d.) means for transferring all of said element data comprising said partial information into a hardware FIFO means if the first quiet zone is four times wider than said bar width, and dumping said data if this criteria is not established indicating that extraneous printed matter has been read;

e.) means for moving said data into a software FIFO means and determining a new quiet zone value;

f.) means for searching for an ending quiet zone in said software FIFO means with said element data, and dumping said data if said ending quiet zone is not located;

g.) means for searching said FIFO means for a START, or alternatively a STOP code and dumping said data if said START/STOP code is not found;

h.) means for loading one-half of said element data from said software FIFO means into a memory device in a direction starting from a first location if a START code is located, whereas it is loaded from a last location if the STOP code is located;

i.) means for decoding said element data comprising one-half said symbol for presenting in an alpha-numeric form;

j.) means to obtain additional partial information which is obtained by any other random scan of said symbol, and storing said partial information including a third quiet zone in said firmware means;

k.) means for pre-processing via said firmware means the additional partial information comprising said other element data to ascertain whether said third quiet zone is at least four times wider than a first bar of said other data;

l.) means for transferring said pre-processed other element of data into said hardware FIFO means when the third quiet zone is at least four times wider than the first bar of said element data;

m.) means for moving said data into said software FIFO means and determining a new quiet zone value;

n.) means for searching for an ending fourth quiet zone at an end of said other element data in said software FIFO means, and dumping said data if it is not present;

o.) means for searching for a START, or alternatively, a STOP code, and dumping said data when the START/STOP code that was not located;

p.) means for loading one-half of said other element data comprising said partial information into said memory means;

q.) means for decoding said other element data for presenting in alpha-numeric form to complete the interpretation of said symbol, r.) whereby, a symbol of small aspect ratio may be readily interpreted.

18. The apparatus in accordance with claim 17 wherein said means for producing random scans comprises an omnidirectional scanner which generates a horizontal, two diagonal, and two substantially vertical shifting lines which intersect only once in their movement.

19. The apparatus in accordance with claim 17 wherein said firmware means stores data in hexadecimal form.

20. The apparatus in accordance with claim 19 and further including means for evaluating in firmware means the hexadecimal values of said data and quiet zones appearing at the beginning and end of partial information obtained by any random scan.

21. A method for interpreting a bar coded label derived from element data obtained by random multiple scans of bars and spaces from a scanning beam comprising the steps of, a.) scanning said label with any one of said multiple random scans;

b.) pre-processing said acquired data which includes a first beginning quiet zone, and comparing a first bar element of said data with said first quiet zone to determine whether a ratio test of the first quiet zone width is at least four times greater than the width of said bar element;

c.) transferring said data and quiet zone into a FIFO means upon passing an evaluation that the bar element data has passed said ratio test;

d.) said transferred data being at least one-half in length of said label, otherwise, it is dumped;

e.) searching said FIFO means for an second quiet zone at an end of said data, and dumping said data it said second quiet zone is not located;

f.) searching for said START or, alternatively, a STOP code in said data located in said FIFO means for determining a direction for processing said data;

g.) decoding one-half said data and determining whether said decoded characters are relative to a front half, or alternatively a back half of the label being scanned;

h.) pre-processing additional acquired element data obtained by any other one of said random scans by comparing the width dimension of a first bar element with a third beginning quiet zone to determine in accordance with the ratio test whether said third quiet zone width is at least four times greater than the width of said bar element;

i.) transferring said data and third quiet zone into a FIFO means and said transferred data being at least one-half in length of said label;

j.) searching for a STOP or START code that is different from the first mentioned START/STOP code such that only different information is being processed;

k.) directly decoding a remaining one-half of said data;

l.) determining whether the decoded characters complete the half of the label that is missing;

m.) whereby the decoding of both halves of said data allows the reading and interpretation of said entire symbol to be acquired for transmitting to a host for display in alpha-numerical form.

22. The method in accordance with claim 21 wherein said pre-processing step comprises evaluating said element data and quiet zones in hexadecimal form in firmware means.

23. The method in accordance with claim 22 and including the step of calculating a means value for said acquired element data.

24. The method in accordance with claim 21 and further including the step of decrementing a counter for a decoding of each byte of said data into a character.

25. The method in accordance with claim 21 including the step of verifying that at least one valid read has been made for each decoded character.

26. An apparatus for interpreting a bar coded symbol formed with bars and spaces comprising:

a.) means for producing a plurality of random and omni-directional scans of a beam any one of which impinges upon and produces reflected signals related to partial information carried by a label bearing said bar coded symbol, and said symbol being comprised of elements of data, b.) said reflected signals including beginning and ending quiet zones;

c.) means for storing in a first memory said reflected signals representing at least one-half of the elements of data including said quiet zones comprising said symbol;

d.) means for loading a second memory with at least one-half of said elements of data from said first memory and locating START or STOP codes associated with said data including beginning and ending quiet zone to determine a direction for processing and loading said data;

e.) means for directly decoding one-half of said elements of data into characters and storing each said character into a third memory in a direction as determined by whether the START or STOP code was detected first;

f.) means to determine whether the left or right hand of the label has been acquired upon the decoding of one-half of said characters;

g.) means for acquiring a remaining one-half of partial data comprising said label by any other random scan of said symbol and locating element data including new beginning and ending quiet zones in said first memory, and h.) means for loading said remaining one-half of partial data into said second memory and locating the STOP or START code different from the first-mentioned START or STOP code, and loading said third memory in an opposite direction from the previously loaded direction;

i.) means for directly decoding one-half of said data into said third memory in a direction to complete an acquisition of said complete symbol;

j.) means for displaying all decoded characters in alpha-numeric form.

27. An apparatus in accordance with claim 26 wherein said means for producing said random scans are applied through said label from any direction with a five axis scanner.

28. An apparatus in accordance with claim 26 wherein said quiet zones are dimensioned to have a range of four to eight times the width value of an adjacent element of data.

29. An apparatus in accordance with claim 26 and further including, means for evaluating acquired data after decoding of a character to determine whether at least three elements are wide when Code 39 symbology of bars and spaces is being used.

30. An apparatus in accordance with claim 26 wherein a median value for said elements of data are evaluated.

31. An apparatus in accordance with claim 26 wherein said elements of data are pre-processed by measuring width dimensions of said reflected signals such that the respective quiet zones may be compared with each element data.

32. An apparatus in accordance with claim 31 wherein said reflected signals are measured in hexadecimal form.

33. An apparatus in accordance with claim 26 and further including means coupled to said direct decoding for checking each element of said data to ascertain if each element width is less than a value established for the quiet zones such that decoding may continue.

34. An apparatus in accordance with claim 33 wherein if the element width is equal to or greater than the established value, the processing of the data is discontinued.

35. An apparatus in accordance with claim 26 wherein a pattern established by said random and omni-directional scans enables at least one-half of the bar coded symbol with an aspect ratio as great as 0.25:1 to be captured by one said scan.

* * * * *